United States Patent
Kasashima et al.

(10) Patent No.: US 8,876,103 B2
(45) Date of Patent: Nov. 4, 2014

(54) PAPER CONVEYING APPARATUS

(71) Applicant: PFU Limited, Kahoku (JP)

(72) Inventors: Yusuke Kasashima, Kahoku (JP);
Shigeru Yonemura, Kahoku (JP);
Norihiro Yamasaku, Kahoku (JP)

(73) Assignee: PFU Limited, Kahoku-shi (JP)

( * ) Notice: Subject to any disclaimer, the term of this patent is extended or adjusted under 35 U.S.C. 154(b) by 0 days.

(21) Appl. No.: 13/941,843

(22) Filed: Jul. 15, 2013

(65) Prior Publication Data

US 2014/0061998 A1    Mar. 6, 2014

(30) Foreign Application Priority Data

Aug. 31, 2012   (JP) .................. 2012-192433

(51) Int. Cl.
*B65H 3/52*    (2006.01)
*B65H 5/06*    (2006.01)

(52) U.S. Cl.
CPC ...................................... *B65H 5/06* (2013.01)
USPC .................................... 271/121; 271/122

(58) Field of Classification Search
CPC ........... B65H 2404/42; B65H 2403/00; B65H 2403/73; B65H 2403/80
USPC ........................ 271/122, 264, 121
See application file for complete search history.

(56) References Cited

U.S. PATENT DOCUMENTS

| | | | | |
|---|---|---|---|---|
| 5,029,839 A | * | 7/1991 | Kajiwara et al. | 271/121 |
| 5,154,412 A | * | 10/1992 | Iseda | 271/227 |
| 6,960,038 B2 | * | 11/2005 | Maekawa et al. | 400/624 |
| 2008/0179817 A1 | * | 7/2008 | Schalk et al. | 271/121 |

FOREIGN PATENT DOCUMENTS

JP    2000-327150    11/2000

* cited by examiner

*Primary Examiner* — Michael McCullough
*Assistant Examiner* — Howard Sanders
(74) *Attorney, Agent, or Firm* — Christie, Parker & Hale, LLP (57) ABSTRACT

There are provided a paper conveying apparatus which can drive paper set guides, paper feed rollers, retard rollers, and conveyor rollers by a single motor. The paper conveying apparatus includes a paper set guide for setting paper, a paper feed roller for feeding paper set at the paper set guide, a retard roller arranged facing the paper feed roller, a conveyor roller for further conveying paper fed by the paper feed roller, a motor for generating a drive force for driving the paper set guide, and a transmission mechanism, arranged straddling a transport path of the paper, for transmitting the drive force to the paper feed roller and the retard roller, wherein the conveyor roller is driven by the transmission mechanism.

3 Claims, 7 Drawing Sheets

PAPER CONVEYING APPARATUS

CROSS-REFERENCE TO RELATED APPLICATIONS

This application is based upon and claims the benefit of priority of prior Japanese Patent Application No. 2012-192433, filed on Aug. 31, 2012, the entire contents of which are incorporated herein by reference.

TECHNICAL FIELD

Embodiments discussed in the present specification relate to paper conveying technology.

BACKGROUND

In a paper conveying apparatus which has paper feed rollers, retard rollers, conveyor rollers, paper set guides, etc., generally the rollers and paper set guides are driven by separate motors. However, if mounting a plurality of motors, there are the problems that the apparatus becomes larger in size and the apparatus becomes higher in price.

An image forming apparatus which has a drive motor which drives feed rollers which separate and feed the paper and conveyor rollers which convey the fed paper has been disclosed. In this image forming apparatus, the drive motor is directly coupled with the conveyor rollers and a drive coupling means is used to selectively convey the drive operation of the drive motor to the feed rollers. Further, the feed rollers have cams attached to them to make the sheet table move up and down. The sheet table moves along with rotation of the feed rollers (see Japanese Laid-Open Patent Publication No. 2000-327150).

SUMMARY

Accordingly, it is an object of the present invention to provide a paper conveying apparatus which can drive paper set guides, paper feed rollers, retard rollers, and conveyor rollers by a single motor.

According to an aspect of the apparatus, there is provided a paper conveying apparatus. The paper conveying apparatus includes a paper set guide for setting paper, a paper feed roller for feeding paper set at the paper set guide, a retard roller arranged facing the paper feed roller, a conveyor roller for further conveying paper fed by the paper feed roller, a motor for generating a drive force for driving the paper set guide, and a transmission mechanism, arranged straddling a transport path of the paper, for transmitting the drive force to the paper feed roller and the retard roller, wherein the conveyor roller is driven by the transmission mechanism.

DESCRIPTION OF EMBODIMENTS

Below, a paper conveying apparatus according to one aspect of the present invention will be explained with reference to the figures. However, the technical scope of the present invention is not limited to these embodiments and extends to the inventions described in the claims and their equivalents.

Figure 1A:
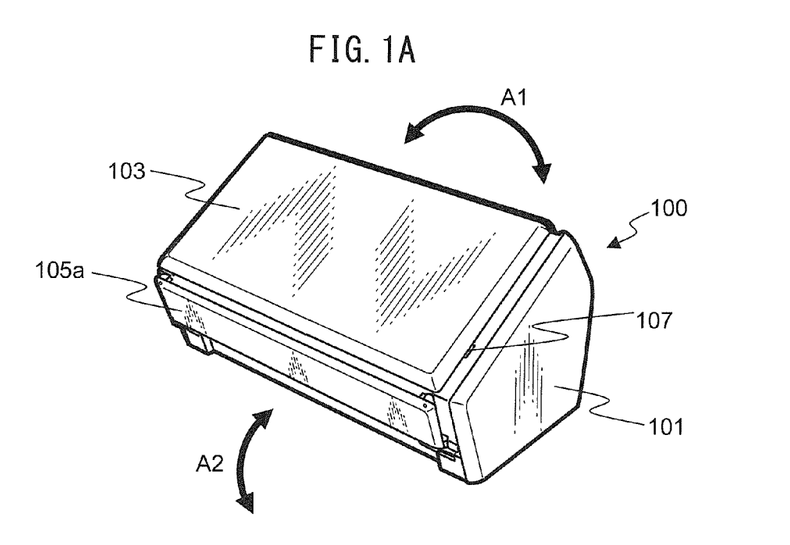
FIG. 1A is a perspective view of a paper conveying apparatus 100.
Figure 1B:
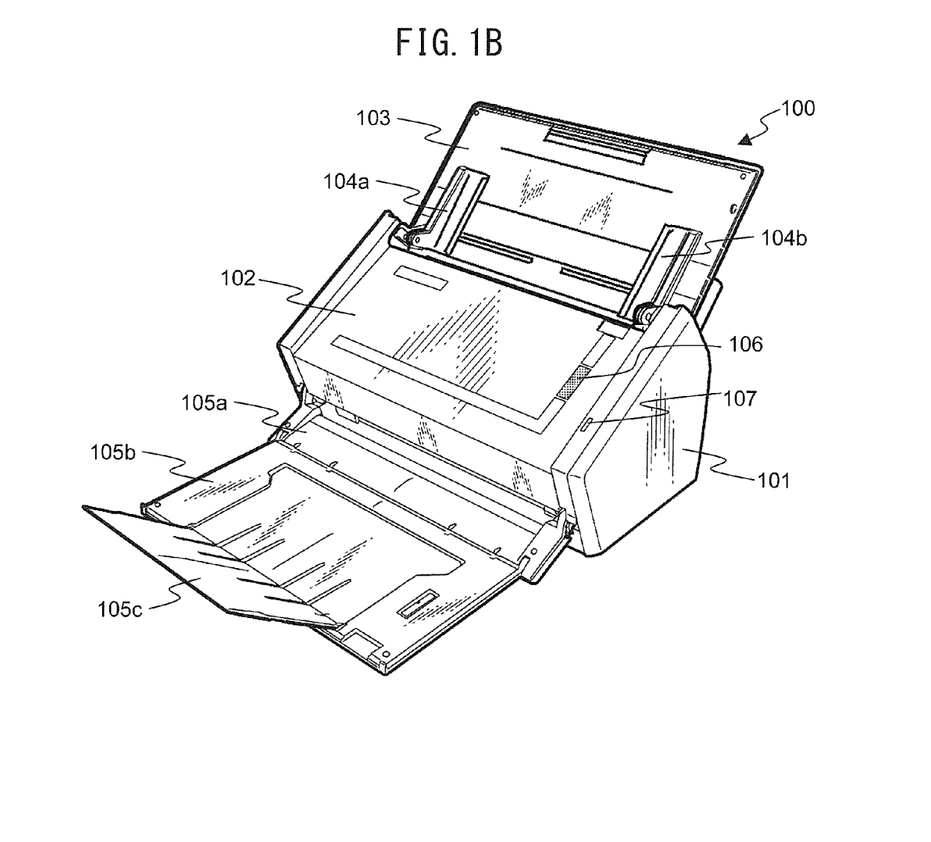
FIG. 1B is a perspective view of a paper conveying apparatus 100.

FIG. 1 is a perspective view which shows a paper conveying apparatus 100 which is configured as an image scanner.

FIG. 1A is a perspective view of a paper conveying apparatus 100 in the state where the paper tray 103 is not set, while FIG. 1B is a perspective view of a paper conveying apparatus 100 in the state where the paper tray 103 is set.

The paper conveying apparatus 100 has a lower housing 101, upper housing 102, paper tray 103, front surface cover 105a, top surface cover 105b, auxiliary cover 105c, operation button 106, opening detector 107, etc.

The upper housing 102 is arranged at a position which covers the top surface of the document conveying apparatus 100 and is engaged with the lower housing 101 by hinges so as to be able to be opened and closed at the time of a paper jam, at the time of cleaning the inside of the document conveying apparatus 100, etc.

The paper tray 103 is engaged with the lower housing 101 by hinges so as to be able to pivot in the direction which is shown by an arrow mark A1. The paper tray 103, in the state which is shown in FIG. 1A, is arranged at a position which covers the upper housing 102, top surface cover 105b, and auxiliary cover 105c and functions as an outer cover. On the other hand, the paper tray 103, in the state which is shown in FIG. 1B, is arranged to enable paper to be placed. The paper tray 103 is provided with side guides 104a and 104b which enable movement in the left and right directions with respect to the conveyance direction of paper. The side guides 104a and 104b can be matched with the width of the paper in position so as to restrict the width direction of the paper.

The front surface cover 105a is engaged with the lower housing 101 by hinges so as to enable pivoting in a direction which is shown by the arrow mark A2. The top surface cover 105b is connected with the front surface cover 105a at one end side and is connected with the auxiliary cover 105c at the other end side. The auxiliary cover 105c, when necessary, is opened up from the top surface cover 105b to hold paper.

The operation button 106 is arranged on the surface of the upper housing 102. If pushed, it generates and outputs an operation detection signal.

The opening detector 107 has a contact detection sensor which is arranged at a position which faces the paper tray 103 in the closed state and detects the opened/closed state of the paper tray 103. The opening detector 107 generates and outputs an opening detection signal which changes in signal value in the state where the paper tray 103 is opened and the state where it is closed.

Figure 2:
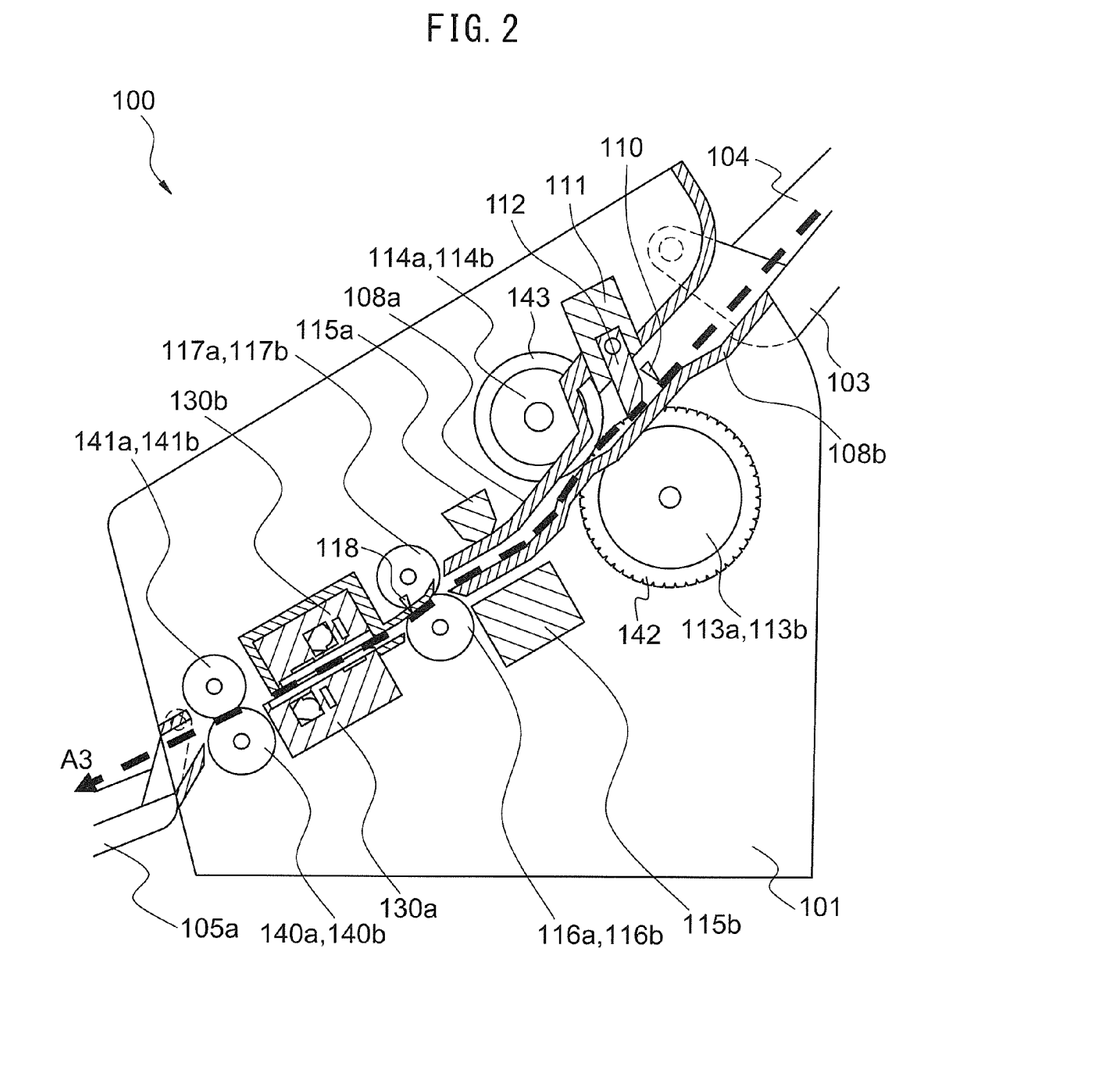
FIG. 2 is a view for explaining a transport route inside a paper conveying apparatus 100.

FIG. 2 is a view for explaining a transport route inside the paper conveying apparatus 100.

The paper conveying apparatus 100 comprises a first paper detector 110, pick arm 111, flap 112, paper feed rollers 113a, 113b, retard rollers 114a, 114b, ultrasonic transmitter 115a, ultrasonic receiver 115b, first conveyor rollers 116a, 116b, first driven rollers 117a, 117b, second paper detector 118, first image capture unit 130a, second image capture unit 130b, second conveyor rollers 140a, 140b, second driven rollers 141a, 141b, etc.

Below, the paper feed rollers 113a and 113b sometimes will be referred to overall as the "paper feed rollers 113", the retard rollers 114a and 114b sometimes will be referred to overall as the "retard rollers 114", the first conveyor rollers 116a and 116b sometimes will be referred to overall as the "first conveyor rollers 116", the first driven rollers 117a and 117b sometimes will be referred to overall as the "first driven rollers 117", the second conveyor rollers 140a and 140b sometimes will be referred to overall as the "second conveyor rollers 140", and the second driven rollers 141a and 141b sometimes will be referred to overall as the "second driven rollers 141".

The bottom surface of the upper housing 102 forms the upper guide 108a of the paper transport path, while the top surface of the lower housing 101 forms the lower guide 108b of the paper transport path. In FIG. 2, the arrow mark A3 shows the conveyance direction of paper. Below, "upstream" means upstream of the conveyance direction A3 of paper, while "downstream" means downstream of the conveyance direction A3 of paper.

The first paper detector 110 has a contact detection sensor which is arranged at the upstream side of the pick arm 111 and detects if a paper is placed on the paper tray 103. The first paper detector 110 generates and outputs a first paper detection signal which changes in signal value between the state where a paper is placed on the paper tray 103 and the state where it is not placed on it.

The paper feed roller 113 is supported to be able to rotate at the main body of the paper conveying apparatus 100. At the outer circumferential surface of the paper feed roller 113, a contact member 142 which contacts the paper which is placed on the paper tray 103 is provided. The contact member 142 is a member made of for example rubber etc., which has a large frictional force with paper.

The retard roller 114 is arranged facing the paper feed roller 113 and restricts conveyance in the conveyance direction A3 of paper which does not contact the paper feed roller 113. The retard roller 114 is supported to be able to rotate at the main body of the paper conveying apparatus 100. At the outer circumferential surface of the retard roller 114, a contact member 143 which contacts the paper which is placed on the paper tray 103 is provided. The contact member 143 is a member made of for example rubber etc. which has a large frictional force with paper.

The ultrasonic transmitter 115a and the ultrasonic receiver 115b are arranged near the paper transport path so as to face each other across the transport path. The ultrasonic transmitter 115a transmits an ultrasonic wave. On the other hand, the ultrasonic receiver 115b detects an ultrasonic wave which was transmitted by the ultrasonic transmitter 115a and passes through the paper and generates and outputs an electrical signal corresponding to the ultrasonic wave which was detected, that is, an ultrasonic wave signal. Below, the ultrasonic transmitter 115a and the ultrasonic receiver 115b will sometimes be referred to all together as an "ultrasonic sensor 115".

The first conveyor roller 116 and first driven roller 117 are supported to be able to rotate at the body of the paper conveying apparatus 100. The first conveyor roller 116 and the first driven roller 117 are arranged at the upstream side of the image capture units 130, while the first driven roller 117 is arranged facing the first conveyor roller 116 above the first conveyor roller 116.

The second paper detector 118 has contact detection sensors which are arranged at the downstream side of the first conveyor roller 116 and the first driven roller 117 and at the upstream side of the first image capture unit 130a and the second image capture unit 130b and detects if there is paper in front of the first image capture unit 130a and the second image capture unit 130b. The second paper detector 118 generates and outputs a second paper detection signal between the state where there is paper in front of the first image capture unit 130a and the second image capture unit 130b and the state in which there is no paper there.

The first image capture unit 130a has a CIS (contact image sensor) of an equal magnification optical system type which is provided with an image capture element using CMOS's (complementary metal oxide semiconductors) which are arranged in a line in the main scan direction and reads the front surface of the paper to generate and output an image signal. The second image capture unit 130b is arranged facing the first image capture unit 130a above the first image capture unit 130a. The second image capture unit 130b has a CIS of an equal magnification optical system type which is provided with an image capture element using CMOS's which are arranged in a line in the main scan direction and reads the back surface of the paper to generate and output an image signal. Further, instead of CMOS's, it is also possible to utilize an image capturing sensor of a reduced magnification optical system type using CCD's (charge coupled devices). Below, the first image capture unit 130a and second image capture unit 130b sometimes will be referred to overall as the "image capture units 130".

The second conveyor rollers 140 and second driven rollers 141 are supported at the body of the paper conveying apparatus 100 to be able to rotate. The second conveyor rollers 140 and second driven rollers 141 are arranged at the downstream side of the image capture units 130, while the second driven rollers 141 are arranged facing the second conveyor rollers 140 above the second conveyor rollers 140.

Below, a drive mechanism of the paper conveying apparatus 100 will be explained.

Figure 3:
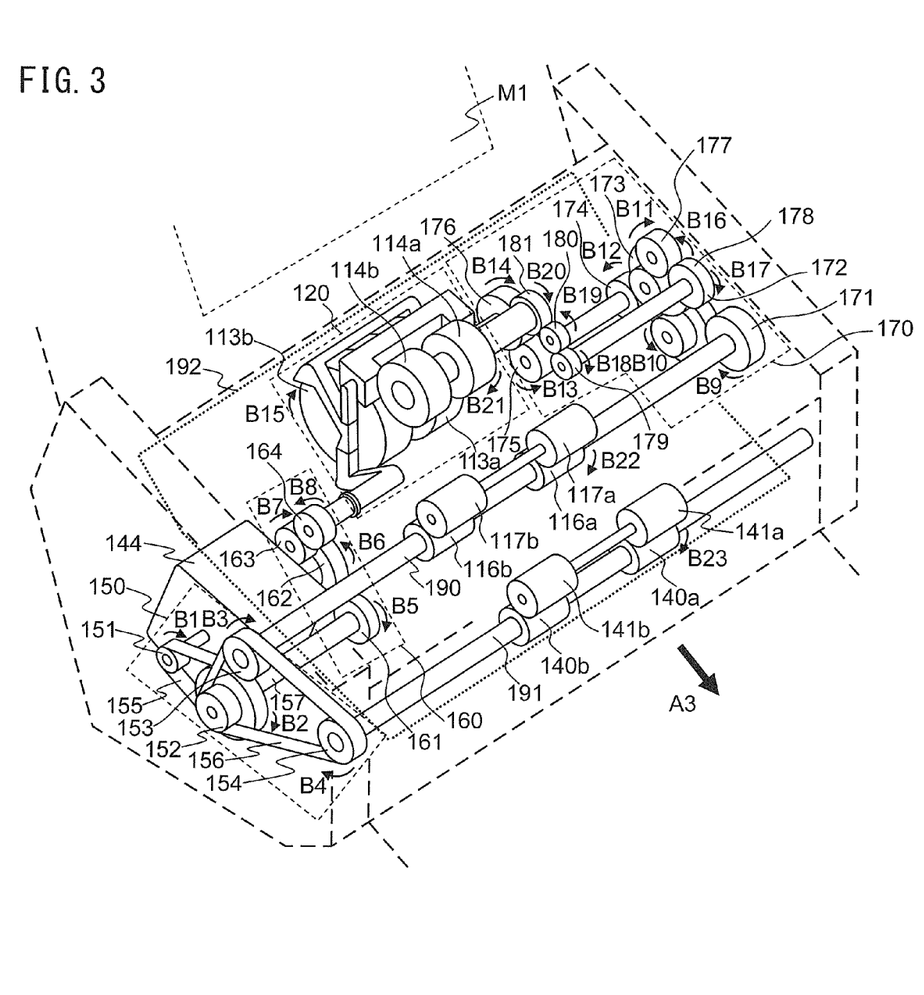
FIG. 3 is a perspective view for explaining a drive mechanism of a paper conveying apparatus 100.
Figure 4:
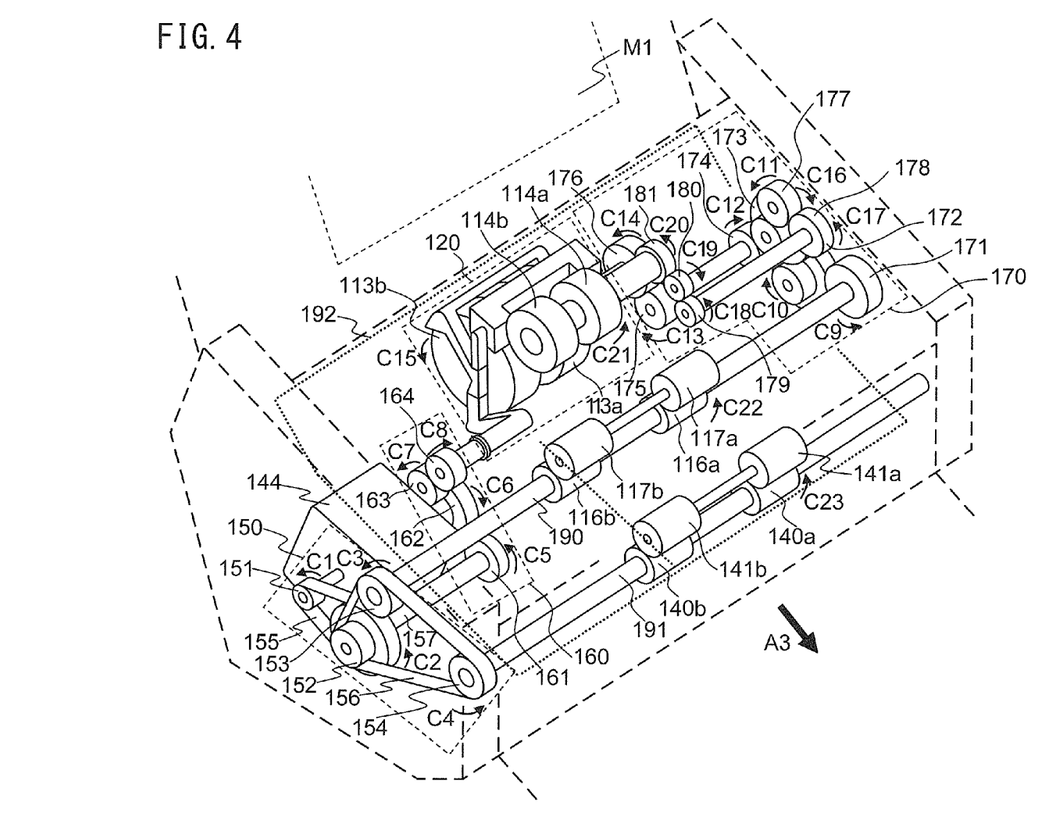
FIG. 4 is a perspective view for explaining a drive mechanism of a paper conveying apparatus 100.
Figure 5A:
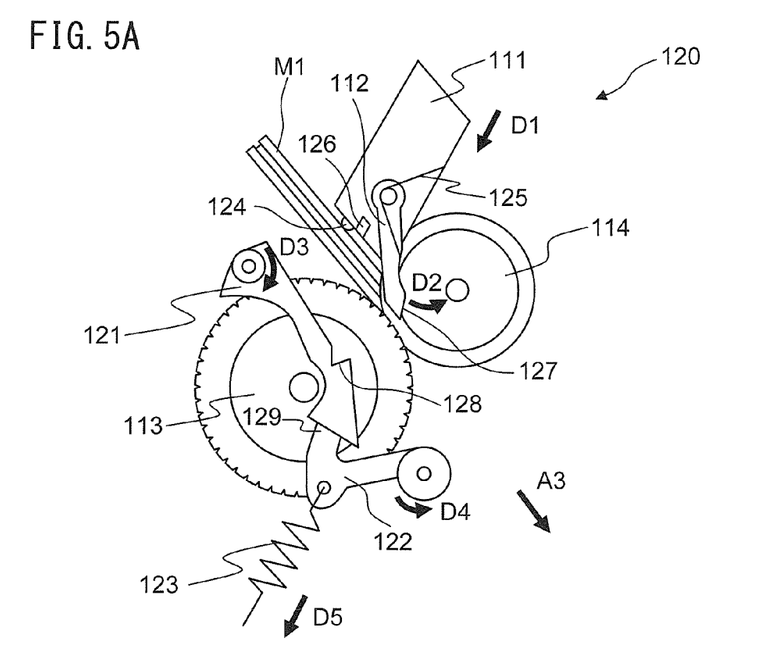
FIG. 5A is a view for explaining a set guide mechanism 120.
Figure 5B:
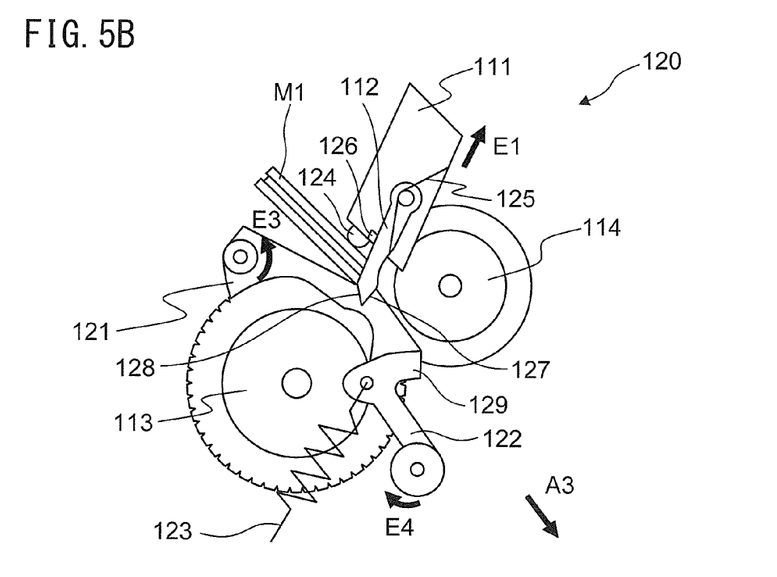
FIG. 5B is a view for explaining a set guide mechanism 120.

FIG. 3 is a view for explaining the operation of the drive mechanism of the paper conveying apparatus 100 in the case where the motor 144 operates forward, while FIG. 4 is a view for explaining the operation of the drive mechanism of the paper conveying apparatus 100 in the case where the motor 144 operates in reverse. Further, FIG. 5A is a view for explaining the operation of a set guide mechanism 120 in the case when the motor 144 operates forward, while FIG. 5B is a view for explaining the operation of a set guide mechanism 120 in the case when the motor 144 operates in reverse. Note that, if conveying the paper in the direction of the arrow mark A3 in the figure, the motor 144 is assumed to be operating forward.

As shown in FIG. 3 and FIG. 4, the drive mechanism of the paper conveying apparatus 100 comprises the set guide mechanism 120, motor 144, a main drive mechanism 150, set guide drive mechanism 160, roller drive mechanism 170, transmission mechanism 190, second conveyor roller drive mechanism 191, etc.

In FIG. 3 and FIG. 4, the motor 144, main drive mechanism 150, and set guide drive mechanism 160 are arranged at the left side (of paper transport path 192 when viewing the paper conveying apparatus 100 from the upper housing 102 side) in the figure. Further, the roller drive mechanism 170 is arranged at the right side in the figure. Furthermore, the transmission mechanism 190 is arranged straddling the paper transport path 192 so as to be able to transmit the drive force from the main drive mechanism 150 which is arranged at the left side in the figure to the roller drive mechanism 170 which is arranged at the right side in the figure. Note that, "straddling the paper transport path 192" means exceeding the two ends of the paper transport path 192 in a direction which perpendicularly intersects the paper conveyance direction A3. Further, the "two ends of the paper transport path 192 in a direction which perpendicularly intersects the paper conveyance direction A3" means the two ends of a range through which a document of the maximum width which the paper conveying apparatus 100 guarantees, passes at the time of paper conveyance.

As shown in FIG. 5A and FIG. 5B, the set guide mechanism 120 has, in addition to the pick arm 111 and flap 112, a paper set guide 121, set guide cam 122, set guide cam spring 123, etc.

The pick arm 111 is arranged at a position facing the paper feed rollers 113 across the paper M1 placed on the paper tray 103. The pick arm 111 is biased by a not shown spring in the direction toward the paper feed rollers 113, that is, the direction of the arrow mark D1. The pick arm 111 supports an arm roller 124 rotatably at a part facing the paper M1.

The flap 112 is engaged with the pick arm 111 by a hinge so as to be able to turn in the direction of the arrow mark D2. The flap 112 is biased by a flap-use spring 125 which is arranged between the flap 112 and the pick arm 111 in a direction toward the paper tray 103, that is, a direction opposite to the arrow mark D2. Note that, the flap 112 uses a stopper 126 which projects out from the side surface of the pick arm 111 to restrict rocking to the paper tray 103 side of the stopper 126.

The paper set guide 121 adjusts the contact between the paper M1 and the paper feed rollers 113. The paper set guide 121 is engaged with the paper conveying apparatus 100 by a hinge so as to be able to turn in the direction of the arrow mark D3. At the top surface of the paper set guide 121, a recessed part 128 is formed for engagement with the front end 127 of the flap 112.

The set guide cam 122 is engaged with the paper conveying apparatus 100 by a hinge so as to be able to turn in the direction of the arrow mark D4. Further, at the set guide cam 122, a projecting part 129 is formed at the end part at the side which is not engaged with the paper conveying apparatus 100. The set guide cam 122 is biased by the set guide cam spring 123 in the downward direction in the figure, that is, in the direction of the arrow mark D5.

The motor 144, as shown in FIG. 3 and FIG. 4, generates drive force for driving the paper feed rollers 113, retard rollers 114, first conveyor rollers 116, second conveyor rollers 140, and set guide mechanism 120. The motor 144 generates drive forces in both the forward direction and reverse direction.

The main drive mechanism 150 comprises a first pulley 151, second pulley 152, third pulley 153, fourth pulley 154, first belt 155, second belt 156, second pulley shaft 157, etc. The first pulley 151 is directly attached to the motor 144. The second pulley 152 is comprised of two pulley parts with different outside diameters which are integrally formed in a coaxial state. Between the larger outside diameter pulley part of the second pulley 152 and the first pulley 151, a first belt 155 is laid. Further, between the smaller outside diameter pulley part of the second pulley 152, third pulley 153, and fourth pulley 154, a second belt 156 is laid. The second pulley shaft 157 is attached at the second pulley 152, a transmission mechanism 190 is attached at the third pulley 153 and a second conveyor roller drive mechanism 191 is attached at the fourth pulley 154.

The set guide drive mechanism 160 comprises a first gear 161, second gear 162, third gear 163, fourth gear 164, etc. The first gear 161 is attached to the second pulley shaft 157. The second gear 162 is comprised of two gear parts with different outside diameters which are integrally formed in a coaxial state. The first gear 161 is engaged with the larger outside diameter gear part of the second gear 162. The smaller outside diameter gear part of the second gear 162 is engaged with the third gear 163, while the third gear 163 is engaged with the fourth gear 164. The fourth gear 164 is directly attached to the set guide mechanism 120.

The roller drive mechanism 170 comprises a fifth gear 171, sixth gear 172, seventh gear 173, eighth gear 174, ninth gear 175, 10th gear 176, 11th gear 177, 12th gear 178, 13th gear 179, 14th gear 180, 15th gear 181, etc. The roller drive mechanism 170 drives the paper feed rollers 113 and retard rollers 114.

The fifth gear 171 is attached to the transmission mechanism 190. The sixth gear 172 is comprised of two gear parts with different outside diameters which are integrally formed in a coaxial state, while the fifth gear 171 is engaged with the larger outside diameter gear part of the sixth gear 172. The seventh gear 173 is comprised of two gear parts with different outside diameters which are integrally formed in a coaxial state, while the smaller outside diameter gear part of the sixth gear 172 is engaged with the larger outside diameter gear part of the seventh gear 173. The smaller outside diameter gear part of the seventh gear 173 is engaged with the eighth gear 174, while the eighth gear 174 is connected through the shaft to the ninth gear 175. The ninth gear 175 is engaged with the 10th gear 176, while the 10th gear 176 is directly attached to the shafts of the paper feed rollers 113a and 113b.

On the other hand, the smaller outside diameter gear part of the seventh gear 173 is engaged with the 11th gear 177, while the 11th gear 177 is engaged with the 12th gear 178. The 12th gear 178 is connected through the shaft to 13th gear 179, while the 13th gear 179 is engaged with the 14th gear 180. The 14th gear 180 is engaged with the 15th gear 181, while the 15th gear 181 is directly attached to the shafts of the retard rollers 114a and 114b.

The transmission mechanism 190 is provided with the first conveyor rollers 116 and is provided with the first driven rollers 117 facing the first conveyor rollers 116 above the first conveyor rollers 116.

The second conveyor roller drive mechanism 191 is provided with the second conveyor rollers 140 and is provided with the second driven rollers 141 facing the second conveyor rollers 140 above the second conveyor rollers 140.

Below, the operation when the motor 144 is operating forward will be explained.

As shown in FIG. 3, when the motor 144 is operating forward, in the main drive mechanism 150, the first pulley 151 rotates in the direction of the arrow mark B1. If the first pulley 151 rotates in the direction of the arrow mark B1, the second pulley 152 rotates in the direction of the arrow mark B2 through the first belt 155, and the third pulley 153 and the fourth pulley 154 rotate respectively in the directions of the arrow mark B3 and the arrow mark B4 through the second belt 156.

When the second pulley 152 rotates in the direction of the arrow mark B2, the first gear 161, second gear 162, third gear 163, and fourth gear 164 of the set guide drive mechanism 160 rotate respectively in the directions of the arrow mark B5, arrow mark B6, arrow mark B7, and arrow mark B8 through the second pulley shaft 157. As explained later, the set guide mechanism 120 enters a paper feed state in which it can feed paper, while the paper M1 which is placed in the paper tray 103 is set between the paper feed rollers 113 and the retard rollers 114.

If the third pulley 153 rotates in the direction of the arrow mark B3, the fifth gear 171, sixth gear 172, seventh gear 173, eighth gear 174, ninth gear 175 and 10th gear 176 of the roller drive mechanism 170 rotate in the directions of the arrow mark B9, arrow mark B10, arrow mark B11, arrow mark B12, arrow mark B13, and arrow mark B14 through the transmission mechanism 190. Therefore, the paper feed roller 113 rotates in the direction of the arrow mark B15, and the paper M1 is conveyed toward the paper conveyance direction A3.

If the seventh gear 173 of the roller drive mechanism 170 rotates in the direction of the arrow mark B11, the 11th gear 177, 12th gear 178, 13th gear 179, 14th gear 180, and 15th gear 181 rotate in the directions of the arrow mark B16, arrow mark B17, arrow mark B18, arrow mark B19, and arrow mark B20. Therefore, a drive force in the direction of the arrow mark B21 is transmitted to the retard rollers 114.

The retard rollers 114 are provided with torque limiters. The torque limit values of the torque limiters are set so that when there is a single sheet of paper, the rotational force through the torque limiters is cut off and when there are a plurality of sheets of paper, the rotational force through the torque limiters is transmitted. Therefore, when there is a single sheet of paper M1, the retard rollers 114 rotate in accordance with the paper feed rollers 113 in the opposite direction to the arrow mark B21. On the other hand, when there are a plurality of sheets of paper M1, the retard rollers 114 rotate in the direction of the arrow mark B21 and separate paper which is in contact with the paper feed rollers 113 and other paper. Therefore, the conveyance of paper other than the paper which is in contact with the paper feed rollers 113 is restricted (double feed is prevented).

By the third pulley 153 rotating in the direction of the arrow mark B3, the transmission mechanism 190 rotates in the direction of the arrow mark B22, the first conveyor rollers 116 rotate in the direction of the arrow mark B22, and the paper M1 is conveyed toward the paper conveyance direction A3.

By the fourth pulley 154 rotating in the direction of the arrow mark B4, the second conveyor roller drive mechanism 191 rotates in the direction of the arrow mark B23, the second conveyor rollers 140 rotate in the direction of the arrow mark B23, and the paper M1 is conveyed toward the paper conveyance direction A3.

As shown in FIG. 5A, if the motor 144 operates forward and the fourth gear 164 rotates in the direction of the arrow mark B8, a drive force in the direction of the arrow mark D4 is transmitted to the set guide cam 122. The set guide cam 122 includes a built-in one way clutch, so the drive force in the direction of the arrow mark D4 is not transmitted to the set guide cam 122. Therefore, the set guide cam 122 rotates in the direction of the arrow mark D4 due to the bias force of the set guide cam spring 123. Along with this, the paper set guide 121 rotates in the direction of the arrow mark D3 and is set to the paper feed state.

The paper set guide 121 can send paper M1 between the paper feed rollers 113 and retard rollers 114 to feed the paper in the paper feed state. The front end 127 of the flap 112 is separated from the recessed part 128 of the paper set guide 121. The bias force due to the flap-use spring 125b is set to become smaller than the force which acts due to the weight of the paper. The flap 112 rocks in the direction of the arrow mark D2 due to the weight of the paper M1, the paper M1 is set between the paper feed rollers 113 and the retard rollers 114, and the sheet of paper at the bottom-most part in the paper M1 contacts the paper feed rollers 113. The pick arm 111 is acted on by a bias force in the direction of the arrow mark D1 due to a not shown spring, whereby the pick arm 111 pushes the paper to the paper feed rollers 113 side.

Below, the operation at the time the motor 144 operates in reverse will be explained.

As shown in FIG. 4, when the motor 144 is operated in reverse, the first pulley 151, second pulley 152, third pulley 153, and fourth pulley 154 rotate in reverse, in the main drive mechanism 150. The rotational directions of the first pulley 151, second pulley 152, third pulley 153, and fourth pulley 154 are shown by the arrow mark C1, arrow mark C2, arrow mark C3, and the arrow mark C4.

If the second pulley 152 rotates in reverse, the first gear 161, second gear 162, third gear 163, and fourth gear 164 of the set guide drive mechanism 160 rotate in reverse through the second pulley shaft 157. The rotational directions of the first gear 161, second gear 162, third gear 163, and fourth gear 164 are shown by the directions of the arrow mark C5, arrow mark C6, arrow mark C7, and arrow mark C8. As explained later, the set guide mechanism 120 enters a standby state where it does not feed paper, and the paper M1 is separated from the paper feed rollers 113 and retard rollers 114.

If the third pulley 153 rotates in reverse, the fifth gear 171, sixth gear 172, seventh gear 173, eighth gear 174, ninth gear 175, and 10th gear 176 of the roller drive mechanism 170 rotate in reverse through the transmission mechanism 190. The rotational directions of the fifth gear 171, sixth gear 172, seventh gear 173, eighth gear 174, ninth gear 175, and 10th gear 176 are shown by the arrow mark C9, arrow mark C10, arrow mark C11, arrow mark C12, arrow mark C13, and arrow mark C14. The paper feed rollers 113 have built-in one-way clutches which transmit a drive force of a direction of the arrow mark B15 of FIG. 3 (forward operation direction of motor 144) and which do not transmit a drive force of a direction of the arrow mark C15 (reverse operation direction of the motor 144). Therefore, a drive force of the direction of the arrow mark C15 is transmitted to the paper feed rollers 113, but the paper feed rollers 113 do not rotate.

If the seventh gear 173 of the roller drive mechanism 170 rotates in reverse, the 11th gear 177, 12th gear 178, 13th gear 179, 14th gear 180, and 15th gear 181 rotate in reverse. The rotational directions of the 11th gear 177, 12th gear 178, 13th gear 179, 14th gear 180, and 15th gear 181 are shown by the arrow mark C16, arrow mark C17, arrow mark C18, arrow mark C19, and arrow mark C20. Therefore, a drive force of the direction of the arrow mark C21 is transmitted to the retard rollers 114, but a drive force of the direction of the arrow mark C21 is cut off by the torque limiters and the retard rollers 114 do not rotate.

If the third pulley 153 rotates in reverse, the transmission mechanism 190 rotates in the direction of the arrow mark C22. The first conveyor rollers 116 have built-in one-way clutches which transmit a drive force of the direction of the arrow mark B22 of FIG. 3 (forward operation direction of motor 144) and do not transmit drive force in the direction of the arrow mark C22 (reverse operation direction of the motor 144). Therefore, a drive force of the direction of the arrow mark C22 is transmitted to the first conveyor rollers 116, but the first conveyor rollers 116 do not rotate.

If the fourth pulley 154 rotates in reverse, the second conveyor roller drive mechanism 191 rotates in the direction of the arrow mark C23. The second conveyor rollers 140 have built one-way clutches which transmit the drive force of the direction of the arrow mark B23 of FIG. 3 (forward operation direction of motor 144) and do not transmit the drive force of the direction of the arrow mark C23 (reverse operation direction of the motor 144). Therefore, the drive force of the direction of the arrow mark C23 is transmitted to the second conveyor rollers 140, but the second conveyor rollers 140 do not rotate.

As shown in FIG. 5B, if the motor 144 operates in reverse and the fourth gear 164 rotates in the direction of the arrow mark C8, the set guide cam 122 rotates in the direction of the arrow mark E4, and the paper set guide 121 rise by the projecting part 129 and is set at the standby state.

The paper set guide 121 separates the paper M1 from the paper feed rollers 113 and retard rollers 114 and prohibits the feed of paper in the standby state. The front end 127 of the flap 112 engages with the recessed part 128 of the paper set guide 121 whereby rocking is restricted. The pick arm 111 is pushed up in the direction of the arrow mark E1 by the flap 112 which is restricted in rocking, whereby the interval between the pick arm 111 and the paper feed rollers 113, that is, the interval between the arm roller 124 and the contact surface of the paper feed rollers 113, becomes wider. At this time, the front end of the paper M1 which is placed on the paper tray 103 strikes the flap 112 which is restricted in rocking and conveyance of the paper M1 is prohibited. The paper at the bottom part of the paper M1 and the paper feed rollers 113 is separated by the paper set guide 121. In this state, even if the paper feed rollers 113 rotate, the paper M1 will not be conveyed.

Below, the significance of arranging the drive mechanisms and transmission mechanisms of the paper conveying apparatus 100 as above will be explained.

The speed reduction ratio of the paper set guide 121 to the motor 144 is 4.79, the speed reduction ratio of the paper feed rollers 113 to the motor 144 is 12.49, and the speed reduction ratio of the retard rollers 114 to the motor 144 is 13.69. By separating the drive mechanism of the paper feed rollers 113 and the drive mechanism of the retard rollers 114 with the close speed reduction ratios, and the drive mechanism of the paper set guide 121 with a speed reduction ratio greatly different from these, at the two sides of the paper transport path 192, it is possible to arrange the large sized gears which are required for greatly changing the speed reduction ratios with a good balance.

Note that, the drive mechanism of the paper set guide 121 with a small speed reduction ratio is realized by a relatively small size gear, but the drive mechanisms of the paper feed rollers 113 and the retard rollers 114 with a large speed reduction ratio require relatively large size gears. By arranging the drive mechanism of the paper set guide 121 at the side where the motor 144 is arranged and there is little empty space and arranging the drive mechanisms of the paper feed rollers 113 and the retard rollers 114 at the opposite side, these drive mechanisms can be efficiently arranged.

Therefore, in the paper conveying apparatus 100, the motor 144 and set guide drive mechanism 160 are arranged at one side of the paper transport path 192, while the roller drive mechanism 170 is arranged at the other side.

When configuring the paper conveying apparatus 100 by a single motor, to transmit the drive force of the motor 144 which is arranged in the above way to the roller drive mechanism 170, the transmission mechanism 190 has to be arranged straddling the paper transport path 192. By arranging the first conveyor rollers 116 at the transmission mechanism 190 which is arranged straddling the paper transport path 192, it is no longer necessary to separately provide a drive mechanism for driving the first conveyor rollers 116 and it is possible to reduce the size of the apparatus.

Note that, instead of arranging the first conveyor rollers 116 at the transmission mechanism 190, it is also possible to arrange the second conveyor rollers 140 and not make the drive mechanism which drives the first conveyor rollers 116 connect to the roller drive mechanism 170 like the second conveyor roller drive mechanism 191.

Further, the transmission mechanism 190 may also be used to make both the first conveyor rollers 116 and the second conveyor rollers 140 rotate. In this case, it is sufficient to lay a belt between the transmission mechanism 190 and the second conveyor roller drive mechanism 191 so that the second conveyor roller drive mechanism 191 and second conveyor roller 140 rotate along with rotation of the transmission mechanism 190.

Further, it is possible to connect one drive mechanism of the drive mechanism of the paper feed rollers 113 and the drive mechanism of the retard rollers 114 to the transmission mechanism 190, and connect the other drive mechanism to the second conveyor roller drive mechanism 191. In this case, the second conveyor roller drive mechanism 191 also functions as a transmission mechanism which transmits a drive force to either of the drive mechanism of the paper feed rollers 113 and the drive mechanism of the retard rollers 114.

Further, in the paper conveying apparatus 100, the second conveyor rollers 140 and the second driven rollers 141 may also be omitted.

Further, it is also possible to not arrange the motor 144, main drive mechanism 150, and set guide drive mechanism 160 at the left side of the paper transport path 192 seen from the upper housing 102 side, and the roller drive mechanism 170 at the right side of the paper transport path, but to arrange them at the opposite sides.

Further, the paper feed rollers 113 need not have built-in one-way clutches. It is also possible to feed the paper in reverse when the motor 144 is operating in reverse. In this case as well, the first conveyor rollers 116 and the second conveyor rollers 140 may have built-in one-way clutches, stop them from rotating when the motor 144 is operating in reverse, and suppress paper clogging when feeding the paper in reverse.

Figure 6:
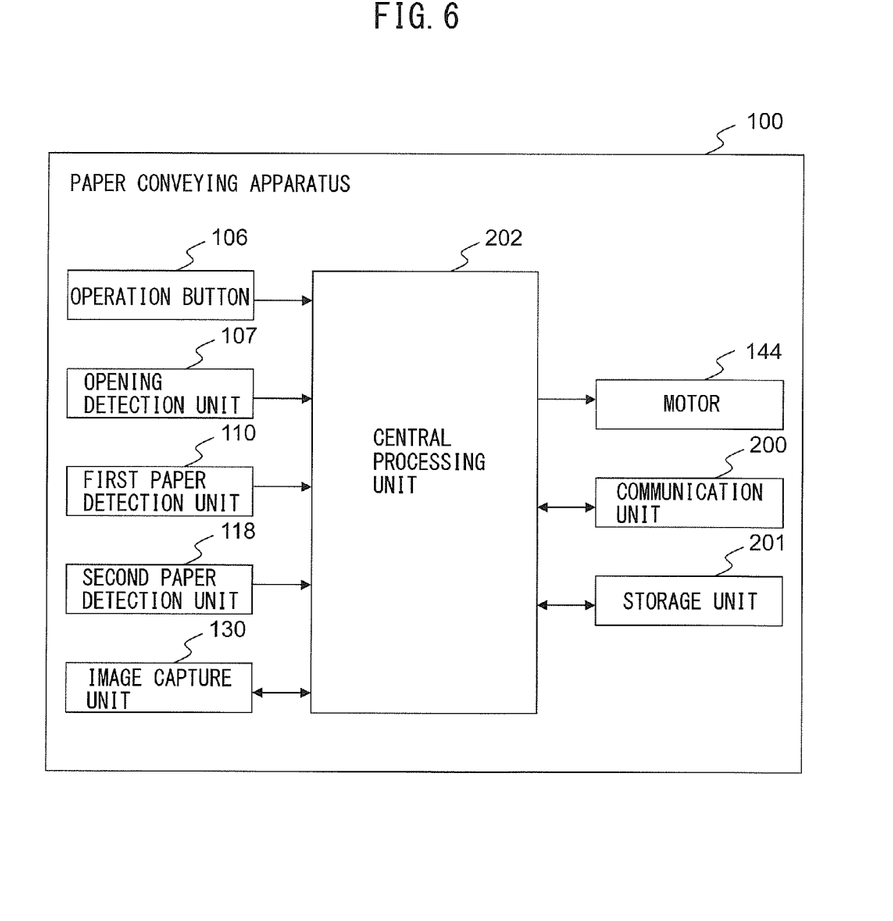
FIG. 6 is a view which shows a schematic configuration of a paper conveying apparatus 100.

FIG. 6 is a view which shows the schematic configuration of the paper conveying apparatus 100. The paper conveying apparatus 100, in addition to the configuration which is shown in the figures, further has a communication unit 200, storage unit 201, and central processing unit 202.

The communication unit 200 has an antenna which sends and receives a wireless signal and a wireless communication interface circuit for sending and receiving a signal through a wireless communication line in accordance with a predetermined communication protocol and communicates through an access point (not shown) with a portable information terminal or other information processing apparatus (not shown). Note that, the communication unit 200 may also directly communicate with the information processing apparatus without going through an access point. Alternatively, the communication unit 200 has a cable communication interface circuit which sends and receives signals through a cable communication line in accordance with a predetermined communication protocol and may communicate by cable with a information processing apparatus.

The storage unit 201 has a RAM (random access memory), ROM (read only memory), or other memory device, a hard disk or other fixed disk device, or flexible disk, optical disk, or other portable storage device. Further, the storage unit 201 stores a computer program, database, tables, etc. which are used in various processing of the paper conveying apparatus 100. The computer program may be installed on the storage unit 201 from a computer-readable, non-transitory medium such as a compact disk read only memory (CD-ROM), a digital versatile disk read only memory (DVD-ROM), or the like by using a well-known setup program or the like. Furthermore, the storage unit 201 stores the image data which is generated from the paper.

The central processing unit 202 is provided with a CPU (central processing unit) and operates based on a program which is stored in advance in the storage unit 201. Note that, the central processing unit 202 may also be comprised of a DSP (digital signal processor), LSI (large scale integrated circuit), ASIC (application specific integrated circuit), FPGA (field-programming gate array), etc. The central processing unit 202 is connected to the operation button 106, opening detector 107, first paper detector 110, second paper detector 118, image capture units 130, motor 144, communication unit 200, and storage unit 201 and controls these parts. The central processing unit 202 performs control of the drive operation of the motor 144, control of the read operation of paper by the image capture unit 130, etc., to read the paper and generate an image.

Figure 7:
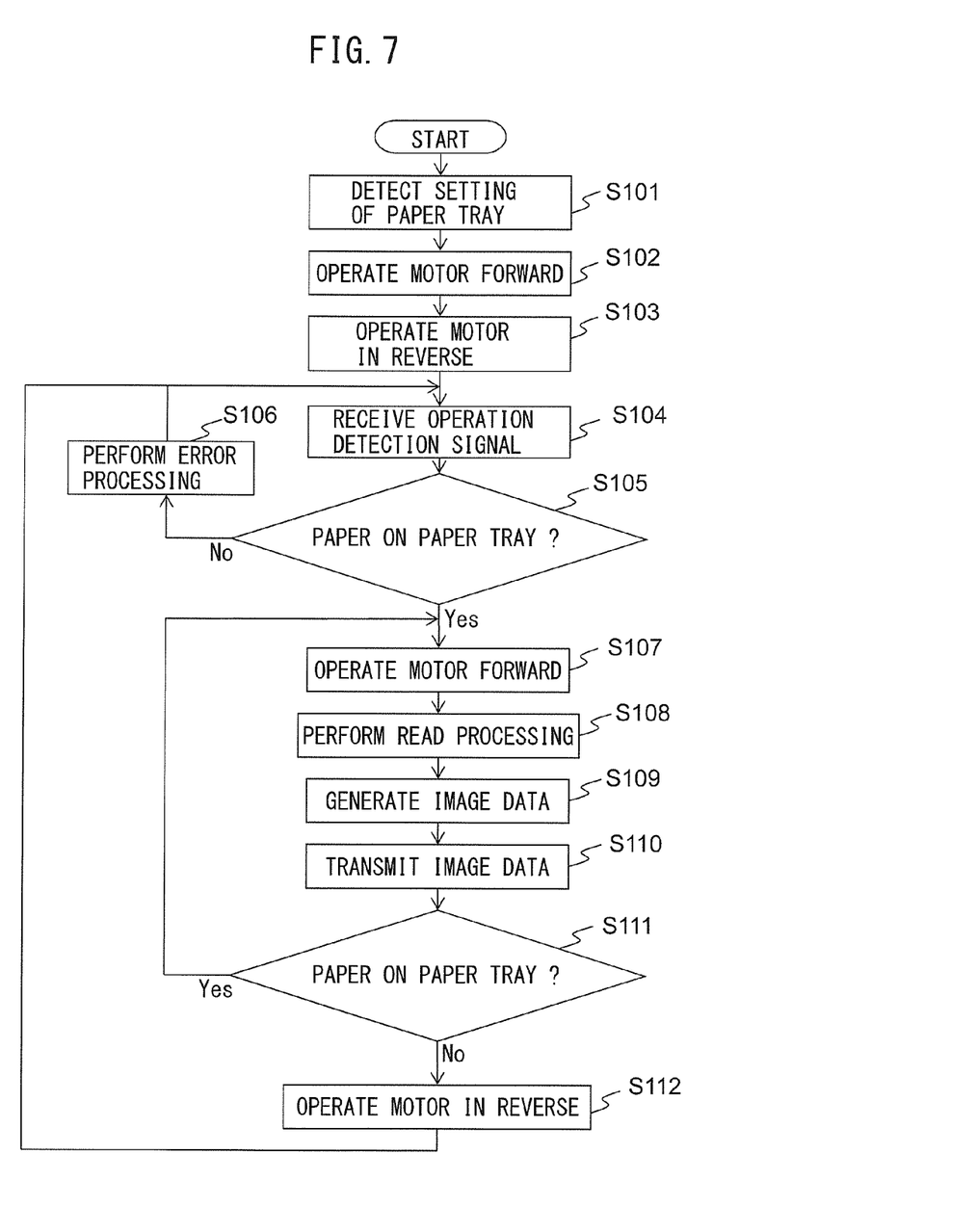
FIG. 7 is a flow chart which shows an example of an operation of image reading processing.

FIG. 7 is a flow chart which shows an example of the operation of the image reading processing by the paper conveying apparatus 100. Below, referring to the flow chart which is shown in FIG. 7, an example of the operation of the image reading processing will be explained. Note that, the flow of operation which is explained below is performed mainly by the central processing unit 202 in cooperation with the elements of the paper conveying apparatus 100 based on a program which is stored in advance in the storage unit 201.

First, the central processing unit 202 monitors the opened/closed state of the paper tray 103 based on the opening detection signal which is received from the opening detector 107 and stands by until detecting that the paper tray 103 has been opened and set by a user (step S101).

Next, if the paper tray 103 is opened, the central processing unit 202 makes the motor 144 operate forward by exactly a predetermined number of pulses and sets the paper set guide 121 to the paper feed state (step S102).

Next, the central processing unit 202 makes the motor 144 operate in reverse for exactly a predetermined number of pulses and sets the paper set guide 121 to the standby state (step S103). The paper set guide 121 is set to the initial position by the processing of steps S102 and S103.

Next, the central processing unit 202 stands by until the user places paper in the paper tray 103 and, furthermore, pushes the operation button 106 and it receives an operation detection signal from the operation button 106 (step S104).

Next, when receiving the operation detection signal from the operation button 106, the central processing unit 202 judges as to whether the paper tray 103 carries paper based on the first paper detection signal which is received from the first paper detector 110 (step S105).

When the paper tray 103 does not have paper placed on it, the central processing unit 202 notifies the user that the paper tray 103 does not have paper placed on it and performs other error processing (step S106). For example, the central processing unit 202 uses a not shown speaker, LED (light emitting diode), etc., to notify the user that the paper tray 103 does not have paper placed on it. Further, the central processing unit 202 returns the processing to step S104 and stands by until newly receiving the operation detection signal from the operation button 106.

On the other hand, when the paper tray 103 has paper placed on it, the central processing unit 202 makes the motor 144 operate forward by exactly a predetermined number of pulses and convey the paper (step S107). Note that, the central processing unit 202 judges the presence of double feed of paper based on an electrical signal which is received from the ultrasonic receiver 115b and makes the motor 144 stop operating and stops the conveyance of paper if detecting double feed of paper.

Next, the central processing unit 202 makes the image capture unit 130 read the conveyed paper (step S108). Note that, the central processing unit 202 monitors if the front end of the paper moves in front of the image capture unit 130 based on the second paper detection signal which is received from the second paper detector 118 and makes the motor 144 stop once if detecting that the front end of the paper has moved in front of the image capture unit 130. Further, the central processing unit 202 calibrates the image capture unit 130, then again drives the motor 144 to convey the paper to the read position of the image capture unit 130 and makes the image capture unit 130 read the paper.

If the image capture unit 130 reads the paper, the central processing unit 202 generates image data from the image signal which is output from the image capture unit 130 (step S109).

Next, the central processing unit 202 transmits the generated image data to a preset destination (step S110). Note that, if the destination is not set, the central processing unit 202 stores the generated image data in the storage unit 201.

Next, the central processing unit 202 judges as to whether paper remains at the paper tray 103 based on the first paper detection signal which is received from the first paper detector 110 (step S111).

If paper remains at the paper tray 103, the central processing unit 202 returns the processing to step S107 and repeats the processing of steps S107 to S110.

On the other hand, when paper does not remain at the paper tray 103, the central processing unit 202 makes the motor 144 operate in reverse by exactly a predetermined number of pulses and sets the paper set guide 121 in the standby state (step S112).

Next, the central processing unit 202 returns the processing to step S104 and stands by until newly receiving an operation detection signal from the operation button 106.

As explained above in detail, the paper conveying apparatus 100 transmits the drive force from the motor 144 directly to the paper set guide 121, transmits it through a transmission mechanism 190 which is arranged straddling the paper transport path to the paper feed rollers 113 and retard rollers 114, and uses that transmission mechanism 190 to drive the first conveyor rollers 116. Therefore, the paper conveying apparatus 100 can drive the paper set guide 121, paper feed rollers 113, retard rollers 114, and first conveyor rollers 116 by a single motor 144 and the cost of the apparatus can be reduced.

Furthermore, the paper conveying apparatus 100 arranges the first conveyor rollers 116 at the transmission mechanism 190 for transmitting the drive force from the motor 144 to the paper feed rollers 113 and retard rollers 114 and thereby it is possible to reduce the size of the apparatus.

Furthermore, the central processing unit 202 controls the single motor 144 to drive all of the paper feed rollers 113, retard rollers 114, first conveyor rollers 116, second conveyor rollers 140, and paper set guide 121 and thereby it is possible to simplify control.

According to the paper conveying apparatus, the drive force from a motor is directly transmitted to paper set guides, is transmitted to paper feed rollers and retard rollers through a transmission mechanism which is arranged straddling the transport path of the paper, and drives the conveyor rollers through that transmission mechanism, so it becomes possible to drive the paper set guides, paper feed rollers, retard rollers, and conveyor rollers by a single motor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A paper conveying apparatus comprising:
   a paper set guide for setting paper;
   a paper feed roller for feeding paper set at the paper set guide;
   a retard roller arranged facing the paper feed roller;
   a conveyor roller for further conveying paper fed by the paper feed roller;
   a motor for generating a drive force for driving the paper set guide; and
   a transmission mechanism, arranged straddling a transport path of the paper, for transmitting the drive force to the paper feed roller and the retard roller straddling the transport path of the paper, wherein
   the conveyor roller is driven by the transmission mechanism, wherein
   the motor is arranged at one side of the paper conveying apparatus in a direction which perpendicularly intersects a paper conveyance direction with respect to the transport path, wherein
   a second drive mechanism for driving the paper feed roller and a third drive mechanism for driving the retard roller are arranged at the other side of the paper conveying apparatus in the direction which perpendicularly intersects the paper conveyance direction, and wherein
   the drive force is transmitted to the paper feed roller through the second drive mechanism and is transmitted to the retard roller through the third drive mechanism.

2. The paper conveying apparatus according to claim 1, wherein a first drive mechanism for driving the paper set guide is arranged at one side of the paper conveying apparatus in the direction which perpendicularly intersects the paper conveyance direction with respect to the transport path.

3. The paper conveying apparatus according to claim 1, wherein
   the motor generates a drive force of a forward direction for feeding the paper and a drive force of a reverse direction from the forward direction, and
   the conveyor roller is provided with a clutch for transmitting the drive force of the forward direction to the conveyor roller and for not transmitting the drive force of the reverse direction.

* * * * *